US005637829A

United States Patent [19]

Nakamura et al.

[11] Patent Number: 5,637,829
[45] Date of Patent: Jun. 10, 1997

[54] TERMINAL BOX FOR MOTOR AND METHOD OF POSITIONING A CONDUIT THEREIN

[75] Inventors: Kosei Nakamura; Kazuhisa Numai; Hideki Oka, all of Yamanashi, Japan

[73] Assignee: Fanuc Ltd., Japan

[21] Appl. No.: 335,396

[22] Filed: Nov. 3, 1994

[30] Foreign Application Priority Data

Dec. 9, 1993 [JP] Japan .................. 5-065751 U

[51] Int. Cl.$^6$ .................................. H02G 3/18
[52] U.S. Cl. .......................... 174/65 R; 285/4
[58] Field of Search ............... 174/65 R, 17 CT; 285/3, 4, 12, 177

[56] References Cited

U.S. PATENT DOCUMENTS

| 1,793,038 | 2/1931 | Zimmermann | 174/37 X |
| 1,980,831 | 11/1934 | Rosenfield | 247/26 |
| 3,926,330 | 12/1975 | Deming et al. | 174/65 R X |
| 4,007,852 | 2/1977 | Greenhardt | 220/3.2 |
| 4,202,457 | 5/1980 | Tansi | 220/3.3 |
| 4,304,957 | 12/1981 | Slater et al. | 174/65 R |
| 4,389,535 | 6/1983 | Slater et al. | 174/65 R |
| 4,732,397 | 3/1988 | Gavin | 277/207 A |
| 4,750,411 | 6/1988 | Eversole | 285/4 X |
| 5,286,040 | 2/1994 | Gavin | 285/4 X |

FOREIGN PATENT DOCUMENTS 1254295  5/1989  Canada ..................... 174/65 R X Primary Examiner—Kristine L. Kincaid
Assistant Examiner—Dean A. Reichard
Attorney, Agent, or Firm—Staas and Halsey

[57] ABSTRACT

A terminal box for a motor is made of a thick plastic plate and includes a plurality of closed windows provided on the terminal box. Each of the closed windows is made of a thin plastic plate. The plurality of closed windows are each surrounded by a groove which is one of a plurality of concentric circular grooves. The terminal box is also provided with a plurality of radial linear grooves passing through a center of the concentric circular grooves to produce an open window for positioning a conduit therein when one of the plurality of closed windows is broken.

2 Claims, 3 Drawing Sheets

TERMINAL BOX FOR MOTOR AND METHOD OF POSITIONING A CONDUIT THEREIN

FIELD OF THE INVENTION

This invention relates to an improvement applicable to a terminal box for a motor. More specifically, this invention relates to an improvement applicable to a terminal box for a small motor for example a motor employable for a machine tool etc.

BACKGROUND OF THE INVENTION

A conduit is usually employed for connection of a small motor, for example, a motor employable for a machine tool. More specifically, each opening for connection with a conduit is provided on each side of a motor frame, along the shaft thereof, and one of the two openings which is more convenient from the practical view-point, is actually employed for connection of a cable by means of a conduit, and the other of the two openings is closed by a blanking cover or a rubber plug.

However, it is not easy to hermetically seal the unemployed opening with a blanking cover or a rubber plug. Therefore, there is a drawback wherein foreign materials, for example oil or the like, enter into a terminal box.

SUMMARY OF THE INVENTION

The object of this invention is to provide a terminal box which does not allow foreign materials, for example oil or the like, to enter therein.

To achieve the foregoing object, a terminal box for a motor in accordance with this invention includes a terminal box proper made of a thick plastic plate provided with plural closed windows made of a thin plastic plate, the closed windows being surrounded by a groove which may be readily broken to produce an open window to arrange a conduit therein.

BRIEF DESCRIPTION OF THE DRAWINGS

This invention, together with its various features and advantages, can be readily understood from the following more detailed description presented in conjunction with the following drawings, in which.

DETAILED DESCRIPTION OF THE PREFERRED EMBODIMENT

Figure 1:
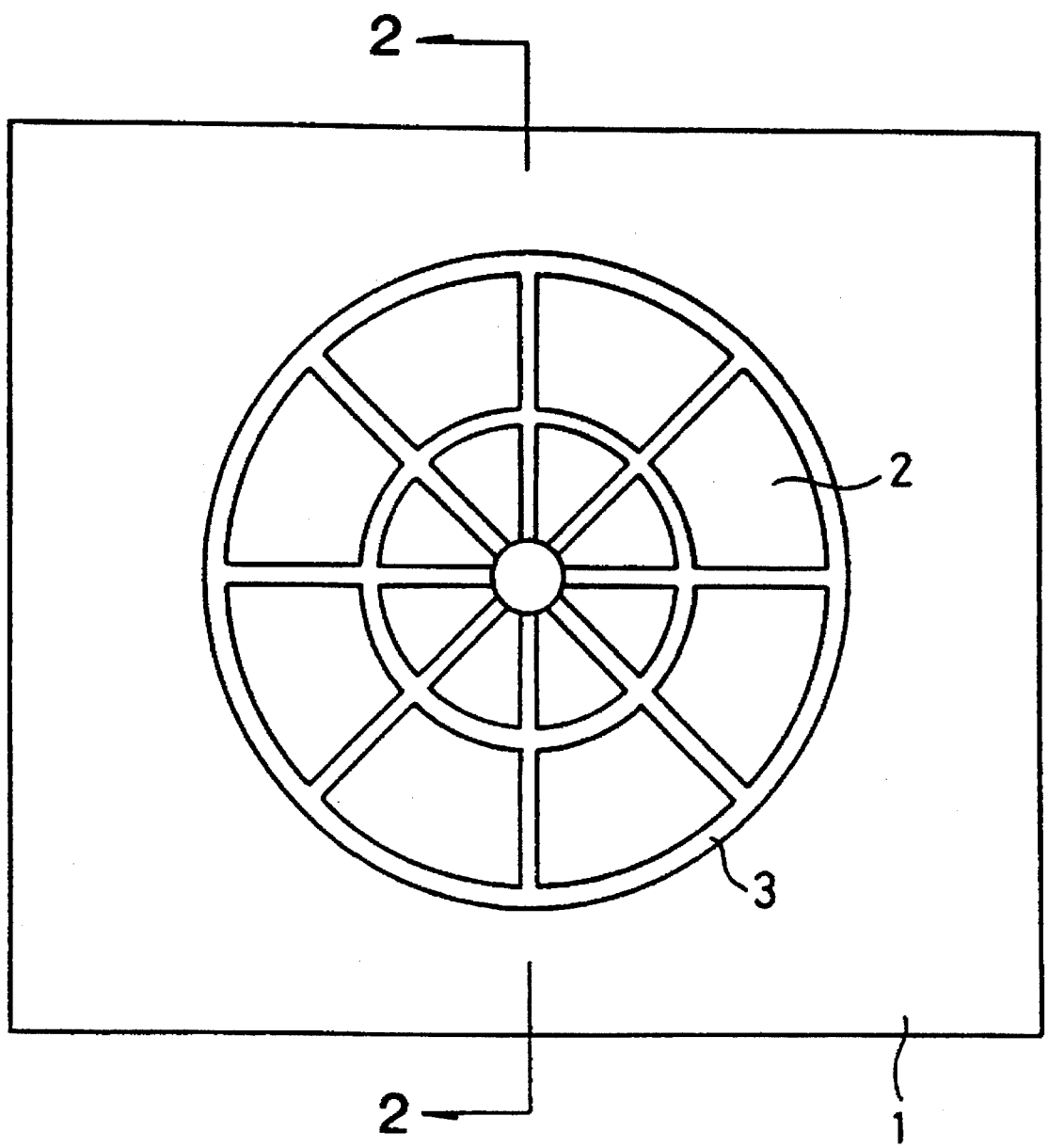
FIG. 1 is a front view of the closed window of a terminal box for a motor in accordance with one embodiment of this invention.

Referring to the drawings, a detailed description will be presented below for a terminal box for a motor in accordance with one embodiment of this invention.

Figure 2:
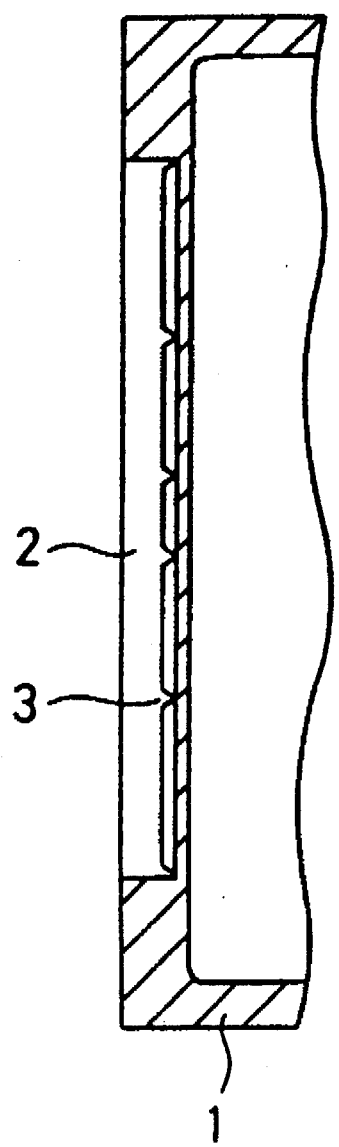
FIG. 2 is a cross section of FIG. 1 along the line A—A.

Referring to FIGS. 1 and 2, a terminal box proper 1 is made of a thick plastic plate, and a closed window 2 which is an area made of a thin plastic plate and connected to the terminal box proper 1 in the beginning, is surrounded by a groove 3. In this embodiment, the groove 3 is produced in concentric circles and in radial lines passing through the center of the concentric circles.

The terminal box proper 1 and the closed window 2 are produced in one body by plastic fabrication. Each closed window 2 is arranged on each side of a motor frame, along the shaft thereof, and one of the two closed windows 2 is actually employed.

The terminal box available in the prior art has, from the beginning, two openings for conduit, and they are closed by blanking covers or rubber plugs, during the period in which the terminal box is unemployed. When the terminal box is employed, one of the blanking covers or rubber plugs is removed to arrange a conduit eventually to close the opening produced by removal of the one of the blanking covers or rubber plugs. Since the tightness of a blanking cover or a rubber plug is not necessarily satisfactory, foreign materials for example oil or the like enter into the terminal box through the unemployed openings for conduit which is sealed with a blanking cover or a rubber plug.

In the case of this invention, however, there is no opening for conduit in the beginning. When a connection is made for a motor, one of the closed windows is broken to allow a conduit to be arranged therein, and the other of the closed windows remains unbroken. Since the unbroken closed window maintains the perfect tightness, foreign material is prevented from entering into a terminal box.

Figure 3:
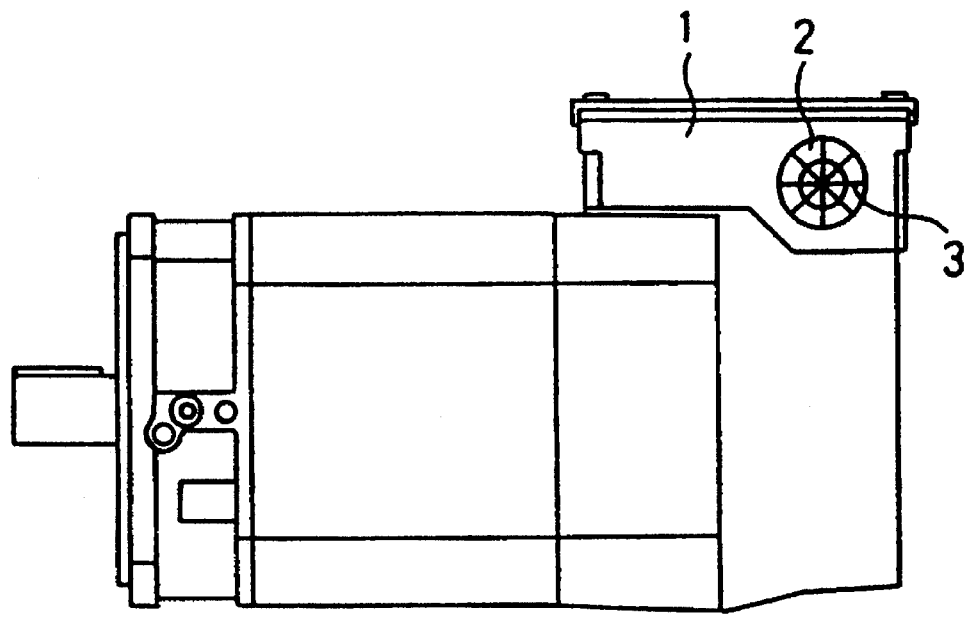
FIG. 3 is a cross section of a motor provided with a terminal box for a motor in accordance with one embodiment of this invention.
Figure 4:
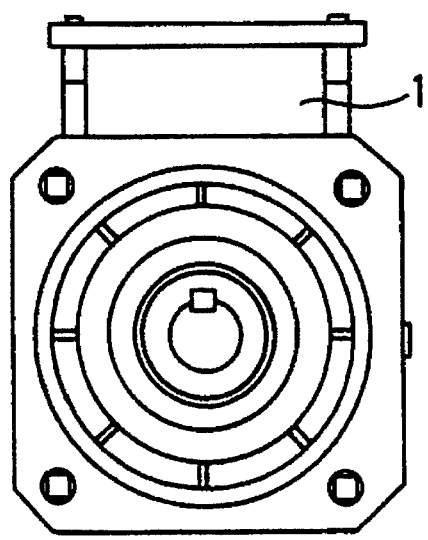
FIG. 4 is a cross section of a motor provided with a terminal box for a motor in accordance with one embodiment of this invention, along the shaft of the motor.

Referring to FIGS. 3 and 4, the terminal box 1 in accordance with this invention is mounted on a motor, as illustrated in the drawings. In other words, the terminal box 1 is mounted on a motor in the manner that each closed window 2 is arranged on each side of a motor frame, along the shaft thereof, and an arbitrary one the closed windows 2 is broken to allow a conduit to pass therethrough, when a connection is made. Since the other of the closed windows 2 remains unbroken, foreign materials, for example oil, are effectively prevented from entering into the motor.

Although this invention has been described with reference to specific embodiments, this description is not meant to be construed in a limiting sense. Various modifications of the disclosed embodiments, as well as other embodiments of this invention, will be apparent to persons skilled in the art upon reference to the description of this invention. It is therefore contemplated that the appended claims will cover any such modifications or embodiments as fall within the true scope of this invention.

What is claimed is:

1. A terminal box for a motor, comprising:
    a terminal box made of a thick plastic plate; and
    a plurality of closed windows provided on said terminal box and each made of a thin plastic plate, said plurality of closed windows each being surrounded by a groove, said groove being one of a plurality of concentric circular grooves, said terminal box also including a plurality of radial linear grooves passing through a center of said concentric circular grooves to produce an open window for positioning a conduit therein when one of said plurality of closed windows is broken.

2. A method for positioning a conduit in a terminal box formed of a thick plastic plate, comprising the steps of:
    providing a plurality of closed windows, each made of a thin plastic plate, on said terminal box;
    surrounding each of said plurality of closed windows by a groove, said groove being one of a plurality of concentric circular grooves;
    providing said terminal box with a plurality of radial linear grooves passing through a center of said concentric circular grooves;
    breaking one of said plurality of closed windows to produce an open window; and
    arranging a conduit in said open window.

* * * * *